(12) United States Patent
Krishnaswamy et al.

(10) Patent No.: US 10,878,821 B2
(45) Date of Patent: Dec. 29, 2020

(54) DISTRIBUTED SYSTEM FOR CONVERSATIONAL AGENT

(71) Applicant: International Business Machines Corporation, Armonk, NY (US)

(72) Inventors: Dilip Krishnaswamy, Bangalore (IN); Shubham Atreja, Bangalore (IN); Prateeti Mohapatra, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 16/189,463

(22) Filed: Nov. 13, 2018

(65) Prior Publication Data

US 2020/0152202 A1    May 14, 2020

(51) Int. Cl.
*G10L 15/22* (2006.01)
*G10L 15/34* (2013.01)
*G06F 3/16* (2006.01)

(52) U.S. Cl.
CPC .............. *G10L 15/34* (2013.01); *G06F 3/167* (2013.01); *G10L 15/22* (2013.01); *G10L 2015/223* (2013.01)

(58) Field of Classification Search
CPC ..................................................... G06F 3/167
See application file for complete search history.

(56) References Cited

U.S. PATENT DOCUMENTS

| 8,370,496 | B1 | 2/2013 | Marr |
| 8,768,313 | B2 | 7/2014 | Rodriguez |
| 9,996,531 | B1* | 6/2018 | Parastatidis ............. G06F 40/35 |
| 10,025,783 | B2* | 7/2018 | Agrawal ............... G06F 16/248 |
| 2005/0153710 | A1* | 7/2005 | Noma .................... H04W 64/00 455/456.2 |
| 2015/0161214 | A1 | 6/2015 | Kali et al. |
| 2017/0091332 | A1* | 3/2017 | Haiby-Weiss ...... G06F 16/9535 |
| 2017/0111503 | A1 | 4/2017 | McGann et al. |
| 2017/0180284 | A1 | 6/2017 | Smullen et al. |
| 2017/0195447 | A1* | 7/2017 | Panagos ............. H04L 67/2814 |
| 2018/0054464 | A1 | 2/2018 | Zhang et al. |
| 2019/0325081 | A1* | 10/2019 | Liu ....................... G10L 15/183 |

FOREIGN PATENT DOCUMENTS

CN          101977242 A      2/2011
WO     WO2017192684 A1   11/2017

* cited by examiner

*Primary Examiner* — Abul K Azad
(74) *Attorney, Agent, or Firm* — Ference & Associates, LLC (57) ABSTRACT

One embodiment provides a method, including: receiving, at a conversational agent system, an input request from a user; sending, within the conversational agent system, the input request to at least one of a plurality of edge nodes, wherein each of the plurality of edge nodes performs at least one of a plurality of tasks and wherein the plurality of edge nodes are located on a common network and communicate with each other; processing, at the at least one of a plurality of edge nodes, the input request to generate a response by comparing the input request to historical inputs stored in a database corresponding to the at least one of a plurality of edge nodes; and providing, at the conversational agent system, the response to the input request to the user.

16 Claims, 3 Drawing Sheets

DISTRIBUTED SYSTEM FOR CONVERSATIONAL AGENT

BACKGROUND

When a user has a problem or question, the user may interact with a conversational agent, for example, chatbot, digital assistant, virtual assistant, or the like. Chatbots generally capture text-based input, for example, a user may access a conversational window and provide text input to the window. The chatbot then processes the input and provides a responsive output, usually as a text-based output. Digital or virtual assistants may include assistants that receive voice input, process the voice input, and then provide a responsive output, for example, by audio, by performing a function, or the like. Conversational agents provide a method for a user to receive assistance with a problem or query that does not require a human user. The conversational agents are programmed to process input and provide output responsive to the input in a manner similar to how another human would engage in the conversation.

BRIEF SUMMARY

In summary, one aspect of the invention provides a method, comprising: receiving, at a conversational agent system, an input request from a user; sending, within the conversational agent system, the input request to at least one of a plurality of edge nodes, wherein each of the plurality of edge nodes performs at least one of a plurality of tasks and wherein the plurality of edge nodes are located on a common network and communicate with each other; processing, at the at least one of a plurality of edge nodes, the input request to generate a response by comparing the input request to historical inputs stored in a database corresponding to the at least one of a plurality of edge nodes; and providing, at the conversational agent system, the response to the input request to the user.

Another aspect of the invention provides an apparatus, comprising: at least one processor; and a computer readable storage medium having computer readable program code embodied therewith and executable by the at least one processor, the computer readable program code comprising: computer readable program code configured to receive, at a conversational agent system, an input request from a user; computer readable program code configured to send, within the conversational agent system, the input request to at least one of a plurality of edge nodes, wherein each of the plurality of edge nodes performs at least one of a plurality of tasks and wherein the plurality of edge nodes are located on a common network and communicate with each other; computer readable program code configured to process, at the at least one of a plurality of edge nodes, the input request to generate a response by comparing the input request to historical inputs stored in a database corresponding to the at least one of a plurality of edge nodes; and computer readable program code configured to provide, at the conversational agent system, the response to the input request to the user.

An additional aspect of the invention provides a computer program product, comprising: a computer readable storage medium having computer readable program code embodied therewith, the computer readable program code executable by a processor and comprising: computer readable program code configured to receive, at a conversational agent system, an input request from a user; computer readable program code configured to send, within the conversational agent system, the input request to at least one of a plurality of edge nodes, wherein each of the plurality of edge nodes performs at least one of a plurality of tasks and wherein the plurality of edge nodes are located on a common network and communicate with each other; computer readable program code configured to process, at the at least one of a plurality of edge nodes, the input request to generate a response by comparing the input request to historical inputs stored in a database corresponding to the at least one of a plurality of edge nodes; and computer readable program code configured to provide, at the conversational agent system, the response to the input request to the user.

A further aspect of the invention provides a method, comprising: obtaining, from a user, an input request for a conversational system; processing the input request at a third-party service, wherein the third-party service can perform a plurality of tasks corresponding to a plurality of input requests; processing, in parallel with the processing at the third-party service, the input request at a plurality of nodes, wherein the plurality of nodes are located on a common network and can communicate with each other and wherein each of the plurality of nodes can perform at least one of the plurality of tasks that can be performed by the third-party service; the processing at the plurality of nodes having a lower latency than the processing at the third-party service; and providing, to the user, a response to the input request, wherein the response is generated responsive to at least one of: the processing at the third-party service and the processing at the plurality of nodes.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components an outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

When conversing with a conversational agent, input provided by the user is sent to a system or server to process the input or request. The system analyzes the request to determine what response should be provided to the user. Conventionally, the analysis and processing of the request is performed by a third-party service, for example, a cloud computing device. In this conventional system the user input is received at a server which pre-processes the input and then passes the pre-processed input to the third-party service. The third-party service is then responsible for understanding the request and generating a response to the request. For example, the third-party service may analyze the request against a database or other data storage to determine what response should be generated. The response generated by the third-party service is then provided to the server, which then provides the response to the user.

The problem with this system is that it takes a significant amount of time to get a response back to the user. This is due to the fact that the input has to be first pre-processed by one entity and then sent to another entity for analysis and response generation. Additionally, since the third-party service is designed to answer or respond to any possible input, it takes a significant length of time for the third-party service to understand the input and generate a response. Thus, there is a high latency associated with such a system. Additionally, the system is inefficient in generating responses because the input is analyzed against all possible responses that could be generated by the conversational agent system.

Accordingly, an embodiment provides a system and method for providing responses to user input requests using a distributed conversational agent system. The system receives an input request from a user, for example, from a user input device (e.g., smart phone, laptop computer, smart television, tablet, etc.). The input request is a request being provided to a conversational agent. For example, a user may access a conversational agent system to request assistance with a problem, question, or other function provided by the conversational agent.

The system sends the input request to one or more edge nodes for processing and response generation. The system includes a plurality of edge nodes, with all of the edge nodes being located on a common network that allows the edge nodes to communicate with each other. Each of the edge nodes has a corresponding functionality or, in other words, performs a particular task. The tasks performed by each of the edge nodes is a task associated with responses provided by a conversational agent. In a conventional system the overall functionality of the conversational agent would be performed by the third-party service. In contrast, in the present system, each of the edge nodes performs a portion of the overall functionality or a task of the overall functionality. Accordingly, the input request can be sent to the edge node that performs the functionality or task that corresponds to the input request.

The edge node then processes the input request by analyzing the input request against a database that corresponds to the edge node. The database includes historical inputs that identify previously submitted input requests and the response that was generated with respect to that input request. The edge node can then use this historical information to generate a response for the current input request. Once the response is generated it can be provided to the user in response to the input request of the user.

Such a system provides a technical improvement over current conversational agent system by providing a system that is able to send the input request to edge nodes that learn responses over time. The edge nodes are located on a more local network than the third-party service. Therefore, the time it takes to send the input request to the edge nodes is greatly reduced as compared to sending the input request to the third-party service. For example, rather than having to send the request from the user device to a server and then to the third-party service, the described system merely sends the input request from the user device to the edge nodes, thereby eliminating the interactions between the server and the third-party service. Additionally, since each edge node is designed to perform specific functionality and learns responses based upon historical responses, the edge nodes do not have to analyze the input request against many possible responses as found in the third-party service, thereby making the response time from the edge nodes quicker than the response time from the third-party service. Thus, the described system is more efficient and faster than traditional conversational agent systems.

Figure 1:
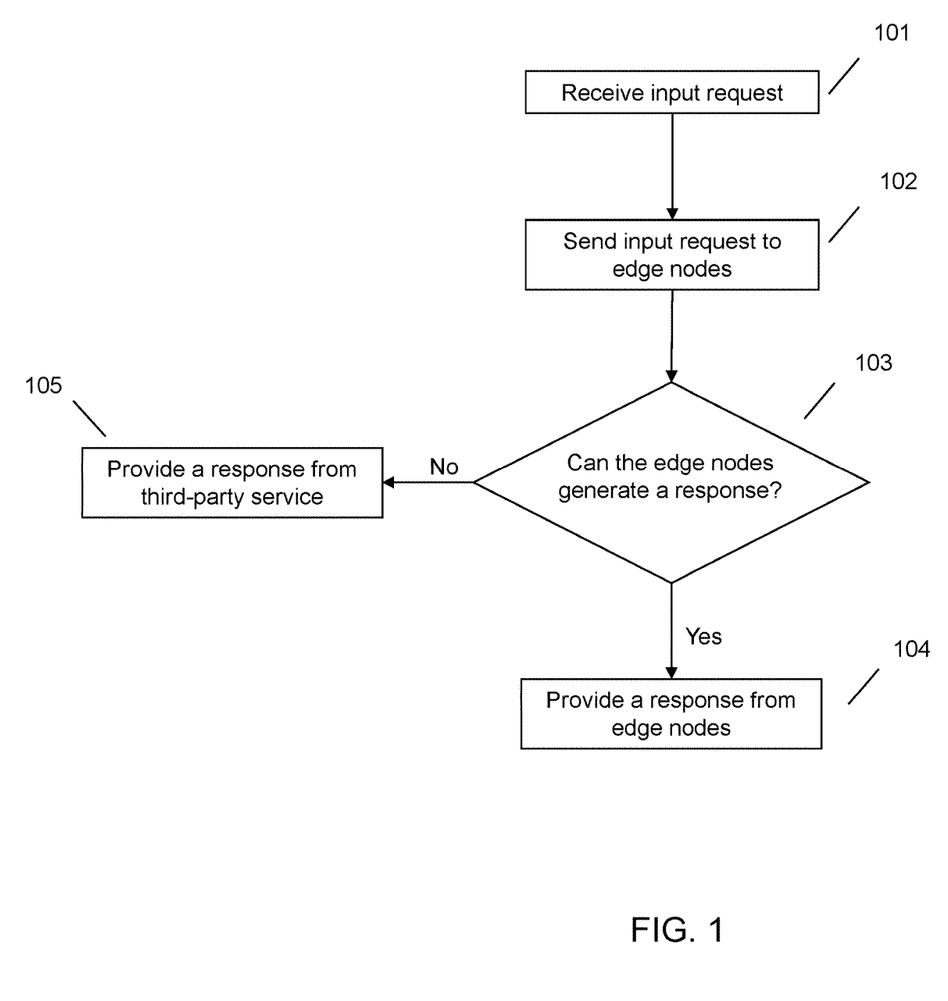
FIG. 1 illustrates a method of providing responses using a distributed conversational agent system.

FIG. 1 illustrates a method for providing responses to user input requests using a distributed conversational agent system. At 101 the system receives an input request from a user. The input request is provided by the user into a conversational agent system. For example, the user may access a conversational agent system or chatbot to receive assistance with a problem, question, request, or other function provided by the conversational agent. The input request may include any form of request, for example, a question, a statement, a command, or the like. The user may provide the input request using a user device, for example, a laptop, smart phone, tablet, digital assistant device, or any other information handling device. Accordingly, the input request may be provided in different formats, for example, as an audio input, text-based input, video-based input, or the like. Depending on the system the input may be converted to a different format. For example, the system may require text-based input. Therefore, the system may include functionality that can convert audio, video, or other non-text-based inputs into a text-based input, for example, natural language processing, speech-to-text processing, and the like.

At 102 the system sends the input request to at least one of a plurality of edge nodes. The plurality of edge nodes are located on a common network that allows the edge nodes to communicate with each other. The plurality of edge nodes performs much of the same functionality as the third-party service of conventional systems. However, instead of each edge node being able to perform all the functions of the third-party service, each edge node is designed to perform a specific task or set of tasks from the overall functionality. In other words, the functionality of the third-party service is distributed across the edge nodes. Thus, the edge nodes act as a distributed system, which reduces the analysis time and allows for provision of a response quicker than using the third-party service. Additionally, the edge nodes may share some functionality across all the edge nodes. In other words, each of the edge nodes may have access to a shared functionality. For example, all of the edge nodes may be able to perform location identification, but only a subset of the edge nodes can perform entity extraction, clustering, and the like. Thus, when sending the input request to the edge nodes, the system may select the edge node that corresponds to the task of the input request.

In the event that multiple edge nodes have common functionality, the system may select an edge node based upon dynamic load balancing. The dynamic load balancing attempts to balance the load of the edge nodes so that none of the edge nodes are either overloaded or underutilized. For example, if one edge node is already processing five input requests and another input request is received, the system may direct the new input request to another node that has the same functionality but that is currently processing fewer requests. The dynamic load balancing assists in reducing the latency for input request processing.

Each of the edge nodes has a corresponding database that stores historical inputs and responses that are related to the functionality performed by the edge node. The system may also include a shared database that is shared across the plurality of edge nodes. The shared database may include historical inputs and responses that are related to the functionality that is shared across all the edge nodes. When the system is first set up, each of the edge nodes and corresponding database, including the shared database, may have no cache or memory of historical requests and inputs. Accordingly, the third-party service may response to all the input requests. As the third-party service responds to the requests, the response is not only provided to the user but is also provided to the edge node where the request was initially sent. The edge node then stores this request and corresponding response in the corresponding database. Thus, when the edge node receives a similar request, the edge node will be able to respond to the request instead of the third-party service.

Therefore, over time, each of the edge nodes locally acquire knowledge from the third-party service in a progressive learning method. The acquired knowledge will correspond to the most common scenarios for the functionality. In other words, the edge nodes may not learn all the functionality of the third-party service. Rather, the edge nodes may only learn the most frequently accessed or common functionality. Additionally, the knowledge of the edge node is dynamic and can change over time. For example, if the edge node learns one function, but that function is no longer needed or is outdated the edge node may learn new functionality or update the known functionality.

As an example of the progressive learning, assume that the edge node has no cache and the third-party service has a large knowledge graph or decision tree that is used to respond to queries or input. Since the edge nodes do not have knowledge of responses, the request or input is answered by the third-party service provider. The response from the third-party service provider is not only provided to the user or requester, but also provided to one or more of the edge nodes. Thus, as the third-party service provider responds to requests or input, the edge nodes learns the responses. Accordingly, over time, each edge node, or combination of edge nodes, will learn to represent some part of the knowledge graph or decision tree of the third-party service provider locally at the edge node(s). Additionally, each edge node can progressively learn the knowledge graph of neighboring nodes in a similar manner. Specifically, as neighbor edge nodes respond to requests, an edge node may learn those responses. The edge node may learn responses by neighbor edge nodes in the case where the edge node has to request information from the neighbor edge node. In other words, if a request or input is received at an edge node and that edge node can only partially provide a response and needs information from a neighbor edge node, then the edge node may learn the response provided by that neighbor in the case that another request is received at the edge node requiring the same response. It should be understood that the progressive learning is not restricted to merely learning a knowledge graph or decision tree. Rather, the progressive learning can be applied to any response technique.

At 103 the system may determine whether the edge nodes can generate a response to the input request. In making this determination, the selected edge node(s) may process the input request to attempt to generate a response to the input request. Processing the request may include accessing the corresponding database and/or the shared database and comparing the received input request to the historical input requests. In the event that a match is found, the edge node may identify what response was provided for the matching historical input request. From that response the edge node may generate a response to the current input request. Since the database corresponds to the edge node, the edge node can optimize the search over the historical inputs, which significantly reduces the input request processing time, particularly as compared to the processing time required by the third-party service, as in conventional systems.

In processing the input request, the edge node may also query other edge nodes. For example, the input request may require multiple tasks be performed in order to respond to the input request. Thus, if the selected edge node can only perform one of the tasks, the edge node may query another edge node that performs another of the tasks. The other edge node may then respond to the query by performing the desired task and returning the result to the querying edge node. Alternatively, instead of querying another edge node, the edge node may simply perform the task associated with the edge node and then send the input request to the edge node that can perform the next task. The edge node may choose to query another edge node if the task of the other edge node is required to finish processing the task of the current edge node. In other words, if the task performed by the other edge node is in the middle of the tasks performed by the current node, it may make sense to simply query the other edge node, rather than transferring the input request to the other edge node. On the other hand, the edge node may choose to transfer the input request if the tasks performed by the edge nodes are sequential and the current edge node cannot perform any other tasks of the input request.

In processing the input request, the system may also send the input request to the third-party service. This may occur either in parallel with sending the request to the edge nodes or may occur after sending the request to the edge nodes. Sending the input request to the third-party service concurrently with sending the request to the edge nodes is referred to as concurrent speculative execution and is selected when time is of the essence. For example, if the input request is very time sensitive, the system may choose to send the request to both the third-party service and the edge node at the same time. Thus, in the event that a response cannot be provided by the edge node, the third-party service is already working on responding to the request and the system only has to wait for the third-party service to finish processing the request. Concurrent speculative execution may also be selected when bandwidth or energy constraints are not important since sending the request to both the third-party service and the edge nodes will require more processing, thereby requiring more bandwidth and energy. On the other hand, if the system sends the request to the third-party service only after the system identifies that no response can be generated from the edge nodes, the system would have to wait for the edge nodes to indicate that no response can be provided, send the request to the third-party service, and then wait for the third-party service to generate the response.

Thus, in the event that the edge nodes cannot generate a response at 103, the system may provide a response to the user from the third-party service at 105. The response generated by the third-party service may also be provided to the edge node that was originally handling the input request. This edge node may then store the input request and response provided by the third-party service in the corresponding database to be used for future input requests.

If, on the other hand, the edge nodes can generate a response at 103, the system may provide a response to the user from the edge nodes at 104. In the event that the input request is provided to both the third-party service and the edge node and a response is returned by both the third-party service and the edge node, the system may select one of the responses to provide to the user. Selecting the response may be based upon a confidence score associated with each of the responses. For example, in generating the response both the edge nodes and the third-party service may also identify a confidence, for example, in the form of a confidence score, to be associated with the response. Then, in providing the response to the user, the system may select the response that has the higher confidence or confidence score. Additionally or alternatively, the response may be selected based upon a time of response. For example, if one of the third-party service provider or the edge node provides a response faster than the other, the response received first may be selected.

Additionally or alternatively, the system may request the both the third-party service provider and an edge node work on providing a response. If one cannot provide a response, then the selected response may be that response which is received from the responding entity. The selection criteria may also be based upon a time limit. For example, if both entities are requested to provide a response, but one does not provide a response within a particular time limit, then the system may select the response that was received within the time limit. Alternatively, a combination of selection criteria may be used. For example, if one entity provides a quick response but has a low confidence score, the system may use another provided response which is slower but has a higher confidence score. As another example, if one entity provides a quick response that has a low confidence score, the system may still select this response if the other entity does not provide a response within a particular time limit.

Figure 2:
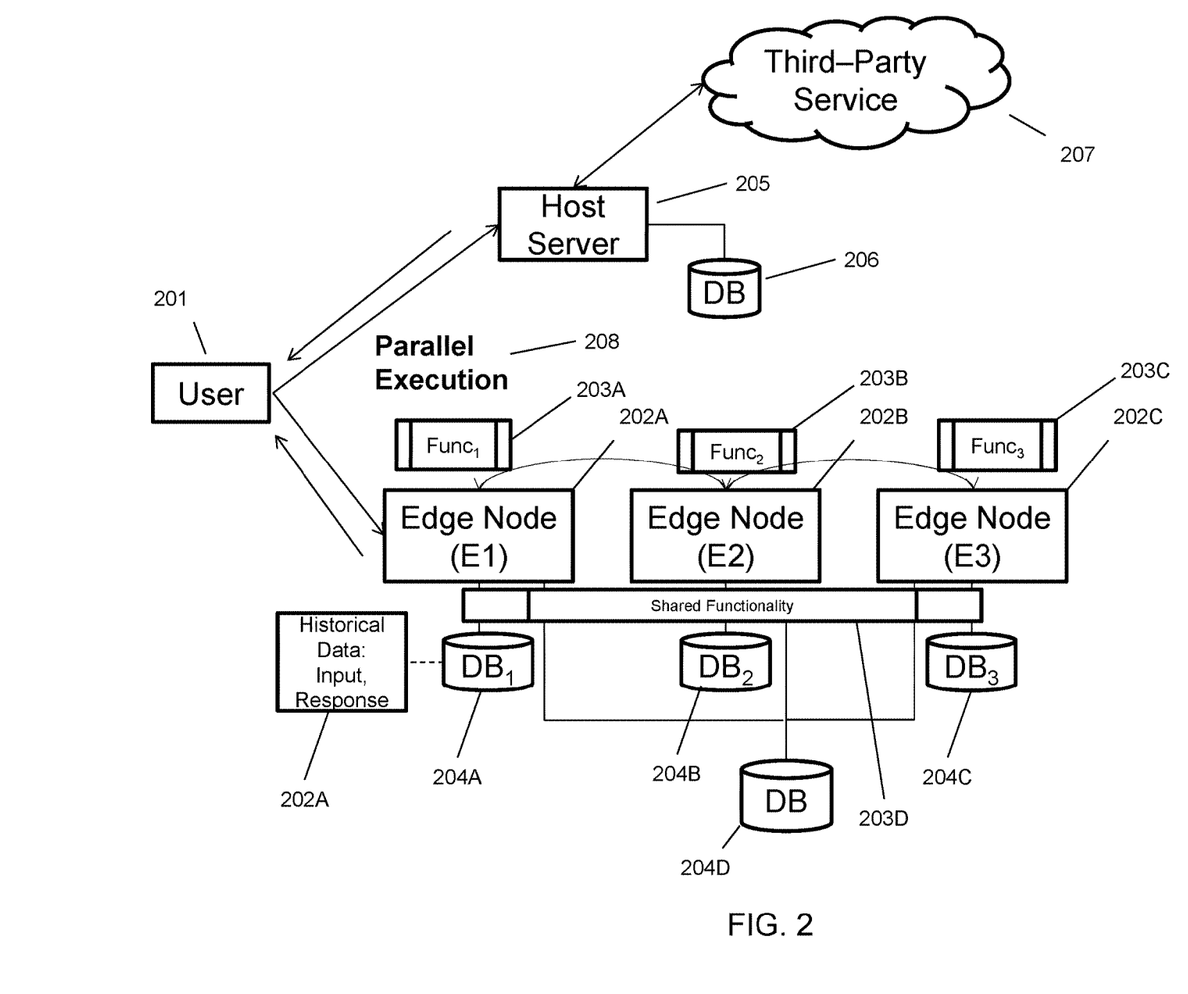
FIG. 2 illustrates an example of a distributed conversational agent system.

A high-level overview of the described system is illustrated in FIG. 2. A request is received from a user 201. The request is at least sent to one of the edge nodes 202A, 202B, and 202C. Each of the edge nodes, 202A, 202B, and 202C, have an associated functionality 203A, 203B, and 203C that allows the corresponding edge node 202A, 202B, and 202C to perform one or more tasks. The edge nodes 202A, 202B, and 202C may also have shared functionality that allows all the edge nodes 202A, 202B, and 202C to perform the same task. The edges nodes 202A, 202B, and 202C also have an associated database 204A, 204B, and 204C that can be accessed to process the input request and generate a response. The edge nodes can also access the shared database 204D that is associated with the shared functionality 203D. The databases 204A, 204B, 204C, and 204D include historical data that includes historical requests and responses that can be used to generate a response to a current request. The request may also be sent to the host server 205, which sends the request to the third-party service 207, in a parallel execution technique 208. The host server may have an associated database 206 that can be accessed to perform processing on the request. Once the responses have been generated by the edge nodes 202A, 202B, and 202C and/or the third-party service 207, the system may provide the response back to the user 201.

Thus, the described systems and methods represent a technical improvement over current conversational agent systems by providing a system that uses a distributed environment to respond to input requests provided by users. The nodes within the distributed environment learn responses over time from the third-party service, thereby allowing the nodes to learn responses to the most common input requests. By using the distributed system to respond to input requests the latency or time required to respond to the requests is greatly reduced as compared to relying on the third-party service to generate a response. Additionally, since each of the nodes within the distributed environment learns specific tasks or functionality, the time it takes the node to analyze and process the request is reduced as compared to the third-party service which has to process the request against all possible requests. Therefore, the described system and method is more efficient and has a reduced latency as compared to traditional systems that solely rely on a third-party service to respond to requests.

Figure 3:
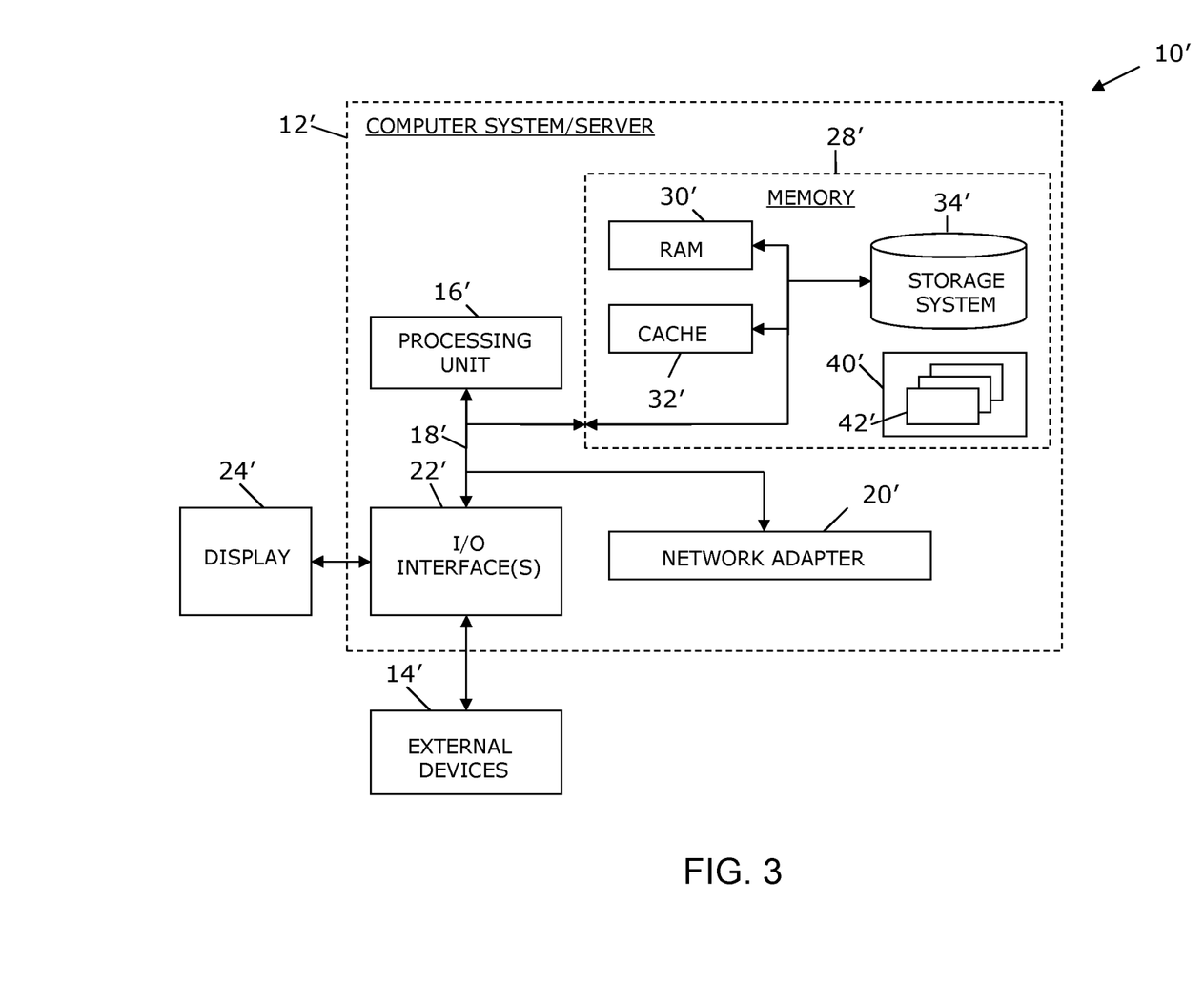
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, at a conversational agent system, an input request from a user;
   sending, within the conversational agent system, the input request to at least one of a plurality of edge nodes, wherein each of the plurality of edge nodes performs at least one of a plurality of tasks and wherein the plurality of edge nodes are located on a common network and communicate with each other;
   sending the input request to a third-party service, in parallel with the sending of the input request to one of the plurality of edge nodes, wherein the third-party service performs the plurality of tasks;
   processing, at the at least one of a plurality of edge nodes, the input request to generate a response by comparing the input request to historical inputs stored in a database corresponding to the at least one of a plurality of edge nodes;
   receiving (i) a service response generated by the third-party service and (ii) a node response generated by at least one of the plurality of edge nodes; and
   providing, at the conversational agent system, the response to the input request to the user, wherein the providing comprises selecting a response from the service response and the node response based upon at least one selection criterion, wherein the at least one selection criterion comprises at least one of: a confidence score corresponding to each of the service response and the node response, a time limit associated with a response, and a response time.

2. The method of claim 1, wherein the processing comprises generating no response from the plurality of edge nodes; and
   wherein the providing a response comprises providing a response from the third-party service.

3. The method of claim 1, wherein each of the edge nodes learns the at least one of the plurality of tasks corresponding to the edge node from responses to previous requests by the third-party service.

4. The method of claim 1, wherein the processing comprises passing the input request from one of the plurality of edge nodes to another of the plurality of edge nodes.

5. The method of claim 1, comprising identifying a task of the input request; and
   wherein the sending comprises sending the input request to an edge node that performs the identified task.

6. The method of claim 1, wherein the processing comprises an edge node currently processing the input request querying another of the plurality of edge nodes.

7. The method of claim 6, wherein the querying comprises selecting another of the plurality of edge nodes to query, based upon the task corresponding to the another of the plurality of edge nodes.

8. The method of claim 1, wherein the conversational agent system comprises shared task functionality shared across all of the plurality of edge nodes.

9. An apparatus, comprising:
   at least one processor; and a computer readable storage medium having computer readable program code embodied therewith and executable by the at least one processor, the computer readable program code comprising:

computer readable program code configured to receive, at a conversational agent system, an input request from a user;

computer readable program code configured to send, within the conversational agent system, the input request to at least one of a plurality of edge nodes, wherein each of the plurality of edge nodes performs at least one of a plurality of tasks and wherein the plurality of edge nodes are located on a common network and communicate with each other;

computer readable program code configured to send the input request to a third-party service, in parallel with the sending of the input request to one of the plurality of edge nodes, wherein the third-party service performs the plurality of tasks;

computer readable program code configured to process, at the at least one of a plurality of edge nodes, the input request to generate a response by comparing the input request to historical inputs stored in a database corresponding to the at least one of a plurality of edge nodes;

computer readable program code configured to receive (i) a service response generated by the third-party service and (ii) a node response generated by at least one of the plurality of edge nodes; and computer readable program code configured to provide, at the conversational agent system, the response to the input request to the user, wherein the providing comprises selecting a response from the service response and the node response based upon at least one selection criterion, wherein the at least one selection criterion comprises at least one of: a confidence score corresponding to each of the service response and the node response, a time limit associated with a response, and a response time.

10. A computer program product, comprising:

a computer readable storage medium having computer readable program code embodied therewith, the computer readable program code executable by a processor and comprising:

computer readable program code configured to receive, at a conversational agent system, an input request from a user;

computer readable program code configured to send, within the conversational agent system, the input request to at least one of a plurality of edge nodes, wherein each of the plurality of edge nodes performs at least one of a plurality of tasks and wherein the plurality of edge nodes are located on a common network and communicate with each other;

computer readable program code configured to send the input request to a third-party service, in parallel with the sending of the input request to one of the plurality of edge nodes, wherein the third-party service performs the plurality of tasks;

computer readable program code configured to process, at the at least one of a plurality of edge nodes, the input request to generate a response by comparing the input request to historical inputs stored in a database corresponding to the at least one of a plurality of edge nodes;

computer readable program code configured to receive (i) a service response generated by the third-party service and (ii) a node response generated by at least one of the plurality of edge nodes; and computer readable program code configured to provide, at the conversational agent system, the response to the input request to the user, wherein the providing comprises selecting a response from the service response and the node response based upon at least one selection criterion, wherein the at least one selection criterion comprises at least one of: a confidence score corresponding to each of the service response and the node response, a time limit associated with a response, and a response time.

11. The computer program product of claim 10, wherein the processing comprises generating no response from the plurality of edge nodes; and wherein the providing a response comprises providing a response from the third-party service.

12. The computer program product of claim 10, wherein each of the edge nodes learns the at least one of the plurality of tasks corresponding to the edge node from responses to previous requests by the third-party service.

13. The computer program product of claim 10, wherein the processing comprises passing the input request from one of the plurality of edge nodes to another of the plurality of edge nodes.

14. The computer program product of claim 10, comprising identifying a task of the input request; and wherein the sending comprises sending the input request to an edge node that performs the identified task.

15. The computer program product of claim 10, wherein the processing comprises an edge node currently processing the input request querying another of the plurality of edge nodes.

16. A method, comprising:

obtaining, from a user, an input request for a conversational system;

sending and processing the input request at a third-party service, wherein the third-party service performs a plurality of tasks corresponding to a plurality of input requests;

sending and processing, in parallel with the sending and processing at the third-party service, the input request at a plurality of nodes, wherein the plurality of nodes are located on a common network and can communicate with each other and wherein each of the plurality of nodes performs at least one of the plurality of tasks that is performed by the third-party service;

the processing at the plurality of nodes having a lower latency than the processing at the third-party service;

receiving (i) a service response generated by the third-party service and (ii) a node response generated by at least one of the plurality of nodes; and providing, to the user, a response to the input request, wherein the response is generated responsive to at least one of: the processing at the third-party service and the processing at the plurality of nodes, wherein the providing comprises selecting a response from the service response and the node response based upon at least one selection criterion, wherein the at least one selection criterion comprises at least one of: a confidence score corresponding to each of the service response and the node response, a time limit associated with a response, and a response time.

\* \* \* \* \*